United States Patent

[11] 3,610,220

| [72] | Inventors | Mitsumasa Yamada<br>Sunto-Gun;<br>Mikio Minoura, Nagoya City, both of Japan |
|---|---|---|
| [21] | Appl. No. | 34,111 |
| [22] | Filed | May 4, 1970 |
| [45] | Patented | Oct. 5, 1971 |
| [73] | Assignee | Toyota Jidosha Kogyo Kabushiki Kaisha<br>Toyota City, Aichi Prefecture, Japan |
| [32] | Priority | May 29, 1969 |
| [33] | | Japan |
| [31] | | 44-49555 |

[54] FUEL TANK CONSTRUCTION
3 Claims, 7 Drawing Figs.

[52] U.S. Cl. .................................................. 123/136,
280/5, 137/571
[51] Int. Cl. ..................................................... F02m 59/00,
B65d 87/12
[50] Field of Search........................................ 123/136;
280/5 A; 137/571, 576, 577, 587, 588, 590.5, 591

[56] References Cited
UNITED STATES PATENTS

| 3,520,329 | 7/1970 | Weber | 137/571 |
| 3,518,977 | 7/1970 | Smith | 123/136 |
| 3,191,587 | 6/1965 | Hall | 123/136 |
| 2,841,127 | 7/1958 | Baster | 123/41.1 |

*Primary Examiner*—Mark M. Newman
*Assistant Examiner*—Cort R. Flint
*Attorney*—Connolly and Hutz ABSTRACT: Fuel tank construction comprises fuel tank with fuel pipe connected thereto. Fuel reclaim vessel has bottom portion positioned at higher elevation than top of fuel tank. Siphon tube has one end adjacent bottom of fuel tank and other end adjacent bottom of fuel reclaim vessel. Intermediate peak portion of siphon tube is positioned at higher elevation than filling port of fueling pipe. Pressure equalizing tube is between top of fueling pipe and fuel reclaim vessel, and an exhaust pipe is connected to fuel reclaim vessel in order to exhaust air and fuel vapor in the vessel.

3,610,220

FUEL TANK CONSTRUCTION

BACKGROUND OF THE INVENTION

The present invention relates to a fuel tank, and more particularly to a gasoline fuel tank for an automobile.

Conventional fuel tanks now associated with automobiles usually include a simple pipe to exhaust air and vapor in the tank. In many instances when the gasoline in the tank becomes heated due to strong sunlight, radiation heat, etc., the fuel escapes through the exhaust pipe. The fuel fumes are discharged into the atmosphere and the liquid fuel simply pours onto the pavement causing the pavement to deteriorate more rapidly. On the other hand, often, the fuel goes into the suction line of the engine thereby making it impossible to start the engine and operate the vehicle. In most cities existing garages and parking space cannot provide sufficient parking area for all of the vehicles driven into the cities. The overflow vehicles are simply left on the streets and when the fuel is heated during warm summer days the expanded fuel is discharged out of the tank. Thus, there is an increasing demand for safe and economical fuel tank constructions which eliminate the above noted disadvantages of the present constructions.

Accordingly, it is an object of the present invention to provide a fuel tank construction which eliminates the discharge of liquid or vapor fuel when the fuel in the tank is expanded due to temperature increases of the fuel.

SUMMARY OF THE INVENTION

In accordance with the present invention a fuel tank construction comprises a fuel tank with a fueling pipe connected thereto. A fuel reclaim vessel has a bottom portion positioned at a higher elevation than the top of the fuel tank. The construction also includes a siphon tube having one end adjacent the bottom of the fuel tank and the other end adjacent the fuel reclaim vessel. The siphon tube has an intermediate peak portion positioned at a higher elevation than the filling port of the fueling pipe A pressure equalizing tube is connected between the top of the fueling pipe and the fuel reclaim vessel. An exhaust pipe to exhaust air and fuel vapor in the vessel is connected to the fuel reclaim vessel.

The end of the exhaust pipe opposite the connection to the fuel reclaim vessel may be vented to the atmosphere. Alternatively, that end of the exhaust pipe may be connected to an engine suction line with a fuel vapor collecting arrangement associated with the exhaust pipe for collecting fuel vapor.

BRIEF DESCRIPTION OF THE DRAWING

Novel features and advantages of the present invention in addition to those mentioned above will become apparent to those skilled in the art from a reading of the following detailed description in conjunction with the accompanying drawing wherein.

DETAILED DESCRIPTION OF THE INVENTION

Figure 1:
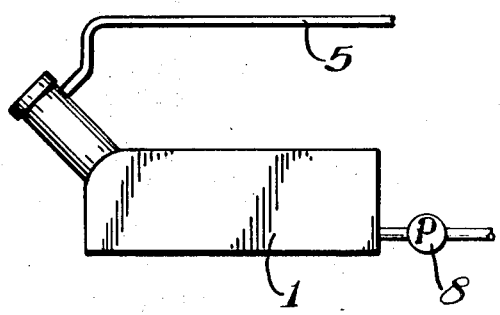
FIG. 1 is a sectional view of a fuel tank well known in the prior art.

Referring in more particularity to FIGS. 2-5 and 7, a fuel tank construction comprises a fuel tank 1 with an expanded fuel reclaim vessel 2 positioned above the fuel tank. The fuel tank 1 and the expanded fuel reclaim vessel 2 are connected together by a tube 3 which acts as a siphon in a manner described more fully below. A pressure equalizing tube 4 connected between the fuel tank 1 and the reclaim vessel 2 balances the pressure between the fuel tank and the reclaim vessel. One end an exhaust pipe 5 is connected to the expanded fuel reclaim vessel 2 and opens at the top 2a of the expanded fuel reclaim vessel 2. The vessel is designed to hold the usual volume of reclaimed expanded fuel.

As shown in the drawing, the bottom 2b of the vessel 2 is located at high elevation than the top 1a of the fuel tank 1. Also, one end of the siphon tube 3 is located adjacent the bottom 1b of the fuel tank 1 while the other end of the siphon tube is located adjacent the bottom 2b of the expanded fuel reclaim vessel 2. As noted above, the siphon tube 3 comprises a pipe which interconnects the fuel tank 1 with the expanded fuel reclaim vessel 2. The intermediate peak portion 3a of the siphon tube 3 is positioned at a higher elevation than the filling port 6a of the fueling pipe 6. A lid 7 is provided for sealing the fueling port 6a of the fueling pipe 6.

One end of the pressure equalizing tube 4 is connected to the fueling pipe 6 and opens at as high a level as possible on the fueling pipe. The other end of the pressure equalizing tube is connected to the expanded fuel reclaim vessel 2 and opens at the top 2a of the extended fuel reclaim vessel 2. The intermediate peak 4a of the pressure equalizing tube 4 located higher than the intermediate peak 3a of the siphon tube 3. The fuel line 9 leads the fuel pump 8 which is connected near the bottom 1b of the fuel tank 1.

Figure 7:
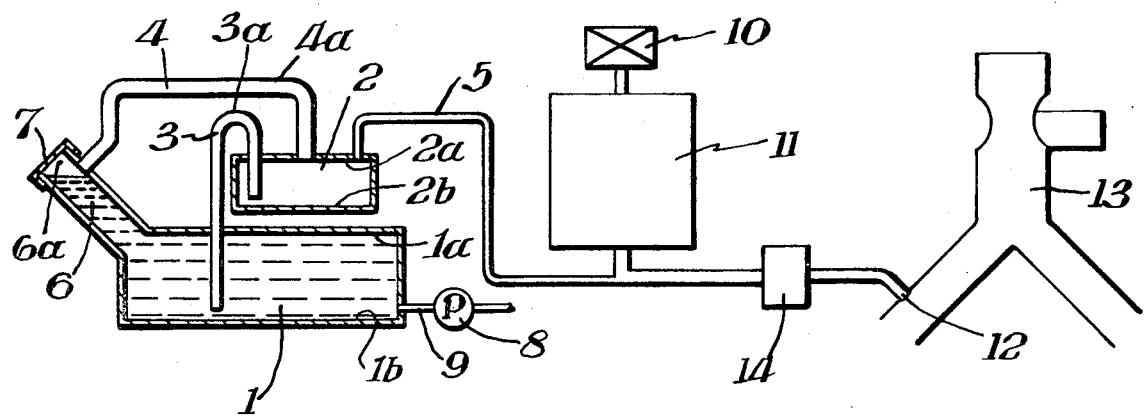
FIG. 7 is a sectional view of a fuel tank construction according to the present invention in combination with a fuel vapor collecting arrangement.

FIG. 7 illustrates the above-described fuel tank construction in combination with a fuel vapor collecting arrangement. The exhaust pipe 5, with one end connected to the reclaim vessel 2, is connected to the engine suction line 12 which leads to the intake manifold of the engine. The control valve 14 is provided. The exhaust pipe 5 is connected to the vapor collecting tank 11 which leads to the filter 10.

Figure 2:
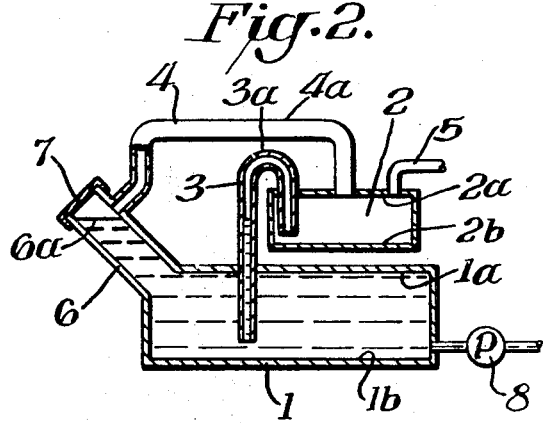
FIG. 2 is a sectional view of a fuel tank construction according the present invention with the tank full of fuel under normal conditions.
Figure 3:
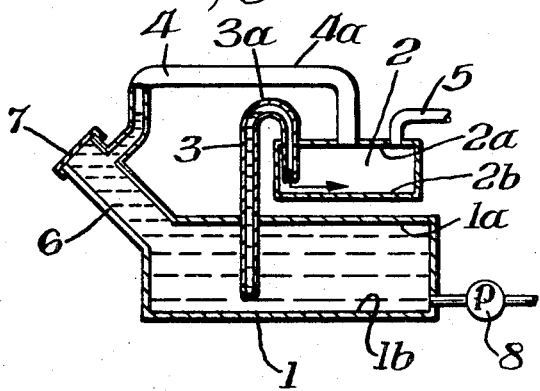
FIG. 3 is a view similar to FIG. 2 illustrating the conditions that exist when the fuel expands.
Figure 4:
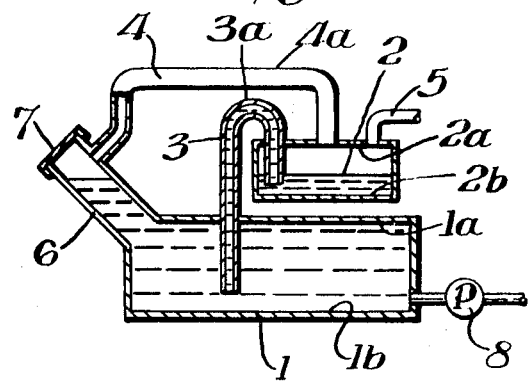
FIG. 4 is a sectional view similar to FIGS. 2 and 3 illustrating the manner in which the expanded fuel is reclaimed.
Figure 5:
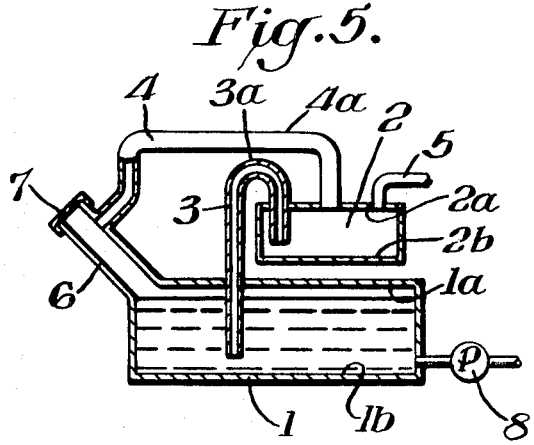
FIG. 5 is a view similar to FIGS. 2-4 illustrating the manner in which the expanded reclaimed fuel is returned to the fuel tank.

FIG. 2 illustrates the condition of the fuel tank 1 immediately after it is filled with fuel with the fueling pipe 6 sealed by the lid. Both the intermediate peak 3a of the siphon tube 3 and the intermediate peak 4a of the pressure equalizing tube 4 are positioned higher than the fueling port 6a of the fuel tank 1. Under these conditions the fuel in the tank cannot discharge into the expanded fuel reclaim vessel 2. However, when the fuel in a full or nearly full fuel tank 1 is heated the fuel as shown in FIG. 3 is expanded whereby the volume of fuel increases. As the fuel expands the fuel level in the siphon tube 3 and the pressure equalizing tube 4 starts to rise. Once the fuel level reaches the intermediate peak 3a of the siphon tube 3 which point is somewhat lower than the intermediate peak 4a of the pressure equalizing tube 4 the tube 3 acts as a siphon and the expanded fuel gasoline is thereby delivered into the expanded fuel reclaim vessel 2. This condition is illustrated best in FIG. 4. As the fuel in the tank 1 is consumed through the fuel line 9, the fuel level in the tank drops below the bottom 2b of the expanded fuel reclaim vessel 2. The reclaim vessel is then ready to reclaim the next volume of fuel which is expanded due to becoming heated.

Figure 6:
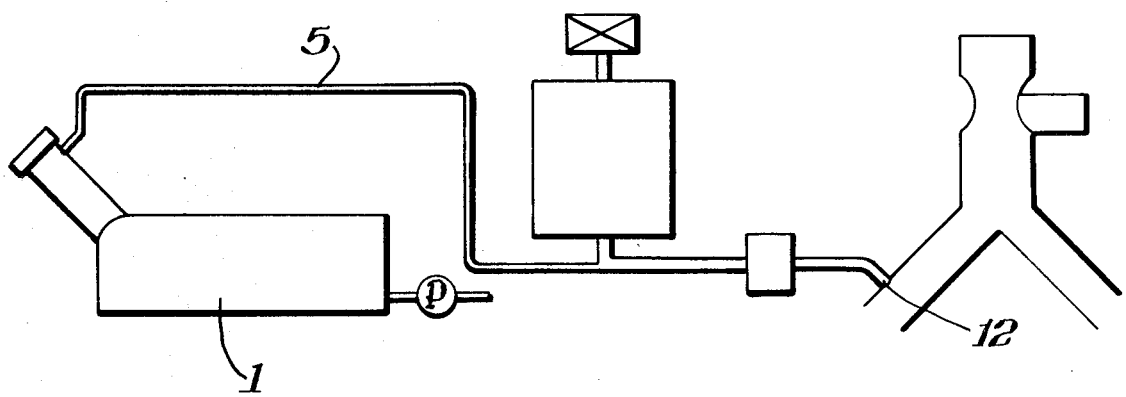
FIG. 6 is a sectional view illustrating a conventional fuel tank with a conventional fuel vapor collector.

FIG. 6 illustrates the above-described fuel tank construction in combination with a fuel vapor collector. The vapor generated in the fuel tank 1 is collected in the expanded fuel reclaim vessel 2 via the siphon tube 3 and the pressure equalizing tube 4. This vapor travels through the exhaust pipe 5 into the vapor collecting tank 11. The collected vapor with its flow rate regulated by the control valve 14 is sent to the engine suction line 12 to be burned.

As described above the fuel tank construction of the present invention enables the reclaiming of overflowing fuel when it is expanded by high temperature. With conventional equipment of the type illustrated in FIGS. 1 and 6, the expanded fuel is simply conveyed away from the fuel tank through the exhaust pipe 5. With the conventional fuel tank shown in FIG. 1 the expanded fuel spills onto the pavement or roadway causing economic loss as well as more rapid deterioration of the roadway materials. Often, without fuel tank construction of the present invention the overflow fuel enters the engine suction line thereby making it impossible to start the engine and operate the vehicle.

With conventional fuel vapor collectors of the type shown in FIG. 6, when fuel is expanded flows out of the tank into the engine suction line thereby preventing startup of the engine. However, with the system illustrated in FIG. 7, the fuel vapor generated in the fuel tank 1 is collected in the vapor collecting tank 11 and sent to the engine suction line 12 to be burned in the engine. The resent invention minimizes the release of fuel vapor into the atmosphere thereby significantly contributing to the abatement of air pollution.

What is claimed is:

1. A fuel tank construction comprising a fuel tank with a fueling pipe connected thereto; fuel reclaim vessel with a bottom portion positioned at a higher elevation than the top of the fuel tank, a siphon tube having one end adjacent the bottom of the fuel tank and the other end adjacent the bottom of the fuel reclaim vessel, the siphon tube having an intermediate peak portion positioned at a higher elevation than the filling port of the fueling pipe, a pressure equalizing tube connected between the top of the fueling pipe and the fuel reclaim vessel, and an exhaust pipe connected to the fuel reclaim vessel.

2. A fuel tank construction as in claim 1 wherein the end of the exhaust pipe opposite the connection to the fuel reclaim vessel is vented to the atmosphere.

3. A fuel tank construction as in claim 1 wherein the end of the exhaust pipe opposite the connection to the fuel reclaim vessel is connected to an engine suction line, and a fuel vapor collecting arrangement associated with the exhaust pipe for collecting fuel vapor.